United States Patent
Chen (10) Patent No.: US 12,470,151 B2
(45) Date of Patent: Nov. 11, 2025

(54) ISOLATED SWITCHING CONVERTER WITH SOFT SWITCHING AND CONTROL METHOD THEREOF

(71) Applicant: Chengdu Monolithic Power Systems Co., Ltd., Chengdu (CN)

(72) Inventor: Xuefeng Chen, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 306 days.

(21) Appl. No.: 18/350,910

(22) Filed: Jul. 12, 2023

(65) Prior Publication Data
US 2024/0039417 A1  Feb. 1, 2024

(30) Foreign Application Priority Data
Jul. 27, 2022 (CN) .......................... 202210891437.3

(51) Int. Cl.
*H02M 3/335* (2006.01)
*H02M 1/00* (2006.01)

(52) U.S. Cl.
CPC ..... *H02M 3/33592* (2013.01); *H02M 1/0058* (2021.05)

(58) Field of Classification Search
CPC ........... H02M 3/33592; H02M 3/3376; H02M 3/33507; H02M 3/33515; H02M 3/33523; H02M 1/0058; H02M 1/0054
See application file for complete search history.

(56) References Cited

U.S. PATENT DOCUMENTS

| | | | |
|---|---|---|---|
| 2010/0027298 A1* | 2/2010 | Cohen | H02M 3/33592 363/21.14 |
| 2018/0358902 A1* | 12/2018 | Duvnjak | H02M 3/33592 |
| 2022/0103078 A1 | 3/2022 | Fan et al. | |
| 2022/0209665 A1 | 6/2022 | Li et al. | |
| 2022/0209676 A1 | 6/2022 | Li et al. | |
| 2022/0393603 A1 | 12/2022 | Chen | |
| 2024/0322701 A1* | 9/2024 | Tsai | H02M 3/01 |

* cited by examiner

*Primary Examiner* — Nguyen Tran
(74) *Attorney, Agent, or Firm* — Perkins Coie LLP (57) ABSTRACT

A controller used in an isolated switching converter with a transformer, a primary switch and a secondary switch, the controller has a maximum sense circuit for providing a first voltage signal representative of a maximum value of a first voltage across the secondary switch, and a timer for starting timing when the first voltage increases to a second voltage signal less than the first voltage signal and stop timing when the first voltage increases to the first voltage signal, and the timing duration of the timer is a first time interval. The secondary switch is turned on for a second ON-time after a current flowing through the secondary switch decreases to zero. The second ON-time of the secondary switch is adjusted so that the first time interval of the next switching cycle is close to a first time threshold.

20 Claims, 8 Drawing Sheets

ISOLATED SWITCHING CONVERTER WITH SOFT SWITCHING AND CONTROL METHOD THEREOF

CROSS-REFERENCE TO RELATED APPLICATIONS

This application claims the benefit of CN application 202210891437.3, filed on Jul. 27, 2022, and incorporated herein by reference.

TECHNICAL FIELD OF THE INVENTION

The present invention generally relates to electronic circuits, and more particularly but not exclusively, to isolated switching converters with soft switching and associated control methods.

BACKGROUND OF THE INVENTION

The Universal Serial Bus (USB) Power Delivery (PD) standard has started gaining popularity among smart devices and notebook computer manufacturers. The USB PD standard allows for a higher power level (up to 100 W) and adaptive output voltages (e.g., 5V to 28V), this trend requires higher power, faster and smaller isolated switching power supplies.

However, as silicon-based devices approach their theoretical performance limits, further performance improvements of the existing isolated power supplies have become more difficult to meet the higher power delivery requirements of PD standards while maintaining high efficiency and low cost.

SUMMARY OF THE INVENTION

An embodiment of the present invention discloses a controller used in an isolated switching converter, the switching converter has a transformer having a primary winding and a secondary winding, a primary switch coupled to the primary winding and a secondary switch coupled to the secondary winding. The controller comprises a maximum sense circuit, a voltage divider, a timer, and an ON-time control circuit. The maximum sense circuit is coupled to the secondary switch to sense a first voltage across the secondary switch and configured to provide a first voltage signal representative of a maximum value of the first voltage. The voltage divider is configured to receive the first voltage signal and provide a second voltage signal less than the first voltage signal. The timer is configured to start timing in response to the first voltage increasing to the second voltage signal and stop timing in response to the first voltage increasing to the first voltage signal, and the timing duration of the timer is a first time interval. The ON-time control circuit is configured to provide an ON-time control signal to control a second ON-time of the secondary switch. The secondary switch is turned on for the second ON-time after a current flowing through the secondary switch decreases to zero. The ON-time control circuit is configured to adjust the second ON-time of the secondary switch so that the first time interval of the next switching cycle is close to a first time threshold.

Another embodiment of the present invention discloses an isolated switching converter. The switching converter comprises a transformer having a primary winding and a secondary winding, a primary switch coupled to the primary winding, a secondary switch coupled to the secondary winding, and a controller. The controller comprises a maximum sense circuit, a voltage divider, a timer, and an ON-time control circuit. The maximum sense circuit is coupled to the secondary switch to sense a first voltage across the secondary switch and configured to provide a first voltage signal representative of a maximum value of the first voltage. The voltage divider is configured to receive the first voltage signal and provide a second voltage signal less than the first voltage signal. The timer is configured to start timing in response to the first voltage increasing to the second voltage signal and stop timing in response to the first voltage increasing to the first voltage signal, and the timing duration of the timer is a first time interval. The ON-time control circuit is configured to provide an ON-time control signal to control a second ON-time of the secondary switch. The secondary switch is turned on for the second ON-time after a current flowing through the secondary switch decreases to zero. The ON-time control circuit is configured to adjust the second ON-time of the secondary switch so that the first time interval of the next switching cycle is close to a first time threshold.

Yet another embodiment of the present invention discloses a control method used in an isolated switching converter. The switching converter has a transformer having a primary winding and a secondary winding, a primary switch coupled to the primary winding and a secondary switch coupled to the secondary winding. The control method comprises: providing a first voltage signal by sampling and holding a maximum value of a first voltage across the secondary switch, providing a second voltage signal less than the first voltage signal, starting a timer set to a first time interval in response to the first voltage increasing to the secondary voltage signal and resetting the timer to the first time interval in response to the first voltage increasing to the first voltage signal, turning on the secondary switch for a second ON-time after a current flowing through the secondary switch decreases to zero; and providing an ON-time control signal to control the second ON-time so that the first time interval of the next switching cycle is close to a first time threshold.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

The present invention can be used in any isolated switching converter with soft switching. In the following detailed description, for the sake of brevity, only a flyback converter is taken as an example to explain and describe the working principle of the present invention.

Figure 1:
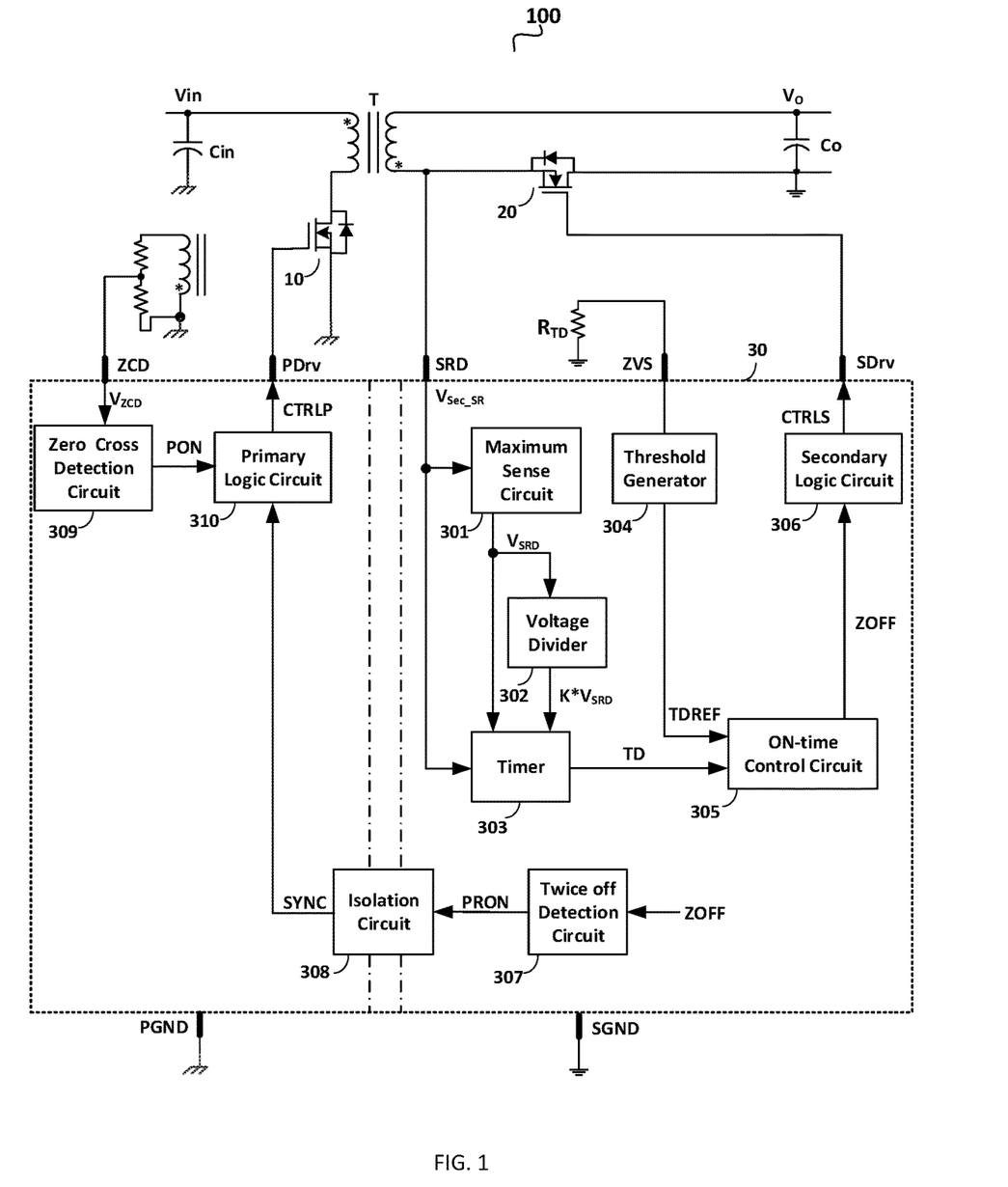
FIG. 1 shows a block diagram of an isolated switching converter 100 in accordance with an embodiment of the present invention.

FIG. 1 shows a block diagram of an isolated switching converter 100 in accordance with an embodiment of the present invention. As shown in FIG. 1, the isolated switching converter 100 comprises a transformer T, a primary switch 10, a secondary switch 20 and a controller 30. The transformer T for providing isolation between a primary side and a secondary side, and has a primary winding, a secondary winding and an auxiliary winding. The primary winding and the secondary winding both have a first terminal and a second terminal. The first terminal of the primary winding receives an input voltage Vin, the first terminal of the secondary winding provides a DC output voltage Vo, and the second terminal of the secondary winding is coupled to a secondary reference Ground (SGND). The primary switch 10 is coupled between the second terminal of the primary winding and a primary reference ground (PGND). The secondary switch 20 is coupled between the second terminal of the secondary winding and a load. However, those skilled in the art should know that the secondary switch 20 may also be coupled between the first terminal of the secondary winding and the load.

The primary switch 10 is coupled to the primary winding, and controls the energy stored in the primary winding to be transferred to the secondary winding. The secondary switch 20 is coupled to the secondary winding, and serves as a synchronous rectifier to replace a traditional rectifier diode, to reduce loss and improve the efficiency of the isolated switching converter 100. In addition, the switching loss may be further reduced by using the parasitic elements of the circuit (e.g., an output capacitance of the primary switch 10 and an excitation inductance of the transformer T) to turn on the primary switch 10 at zero voltage.

In the embodiment shown in FIG. 1, the switching converter 100 operates in a discontinuous conduction mode (DCM), and the primary switch 10 is turned on with zero voltage turning-on technique. Before the primary switch 10 will be turned on at zero voltage, the secondary switch 20 is turned on twice. In detail, after the primary switch 10 is turned off, the secondary switch 20 is turned on. After a current flowing through the secondary switch 20 crosses zero, the secondary switch 20 is turned off. Subsequently, the secondary switch 20 will be turned on again for a second ON-time, to generate a negative current flowing through the magnetized inductance of the transformer T. This negative current is used to discharge the output capacitance of the primary switch 10. After the secondary switch 20 is turned off again, the primary switch 10 is turned on and the next switching cycle starts. In the embodiment of the present invention, the second ON-time of the secondary switch 20 is adjusted in real time based on a comparison between a first time interval $t_D$ and a first time threshold $t_{D\_ref}$ in each switching cycle, so as to completely discharge the output capacitance of the primary switch 10, and the first time interval $t_D$ in the subsequent switching cycle is close to the first time threshold $t_{D\_ref}$, to achieve full zero-voltage switching (Full ZVS) of the primary switch 10.

In the example shown in FIG. 1, the controller 30 comprises a maximum sense circuit 301, a voltage divider 302, a timer 303, a threshold generator 304, an ON-time control circuit 305, a secondary logic circuit 306, and a twice off detection circuit 307, an isolation circuit 308, a zero cross detection circuit 309 and a primary logic circuit 310. In one embodiment, the controller 30 is an integrated circuit chip having a plurality of pins.

As shown in FIG. 1, the maximum sense circuit 301 is coupled to a drain terminal of the secondary switch 20 via a SRD pin to detect a first voltage $V_{Sec\_SR}$ across the secondary switch 20, and has an output terminal to provide a first voltage signal $V_{SRD}$ representative of a maximum of the first voltage $V_{Sec\_SR}$. The voltage divider 302 is coupled to the output terminal of the maximum sense circuit 301 to receive the first voltage signal $V_{SRD}$, and provides a second voltage signal $k*V_{SRD}$ at its output terminal. Wherein k is a ratio greater than 0 and less than 1. In one embodiment, the voltage divider 302 divides the first voltage signal $V_{SRD}$ to provide the second voltage signal $k*V_{SRD}$. The voltage divider 302 may comprise a resistive voltage divider or a capacitive voltage divider. In another embodiment, the voltage divider 302 subtracts a bias voltage signal $(1-k)*V_{SRD}$ from the first voltage signal $V_{SRD}$ to provide the second voltage signal $k*V_{SRD}$ at the output terminal.

In the embodiment shown in FIG. 1, the timer 303 has a first input terminal, a second input terminal, a third input terminal and an output terminal, wherein the first input terminal is coupled to the drain terminal of the secondary switch 20 through the SRD pin for receiving the first voltage $V_{Sec\_SR}$ across the secondary switch 20, the second input terminal is coupled to the output terminal of the maximum sense circuit 301 to receive the first voltage signal $V_{SRD}$, the third input terminal is coupled to the output terminal of the voltage divider 302 to receive the second voltage signal $k*V_{SRD}$. The timer 303 starts timing when the first voltage $V_{Sec\_SR}$ across the secondary switch increases to the second voltage signal $k*V_{SRD}$, and then stop timing when the first voltage $V_{Sec\_SR}$ across the secondary switch 20 increases to the first voltage signal $V_{SRD}$. The timing duration of the timer 303 is the first time interval $t_D$. In one embodiment, the timer 303 may include a combination of multiple comparators and gate circuits.

In the example shown in FIG. 1, the threshold generator 304 is configured to generate a second control signal TDREF. In one embodiment, the second control signal TDREF has an effective width equal to the first time threshold $t_{D\_ref}$. In one embodiment, the threshold generator 304 is coupled to a reference resistor $R_{TD}$ located outside of the controller 30 via a ZVS pin. In one embodiment, the user may select the reference resistor RTD to set the first time threshold $t_{D\_ref}$.

In the example shown in FIG. 1, the ON-time control circuit 305 has a first input terminal, a second input terminal and an output terminal, wherein the first input terminal is coupled to receive a first control signal TD, the second input terminal is coupled to receive the second control signal TDREF. Based on the first control signal TD and the second control signal TDREF, the ON-time control circuit 305 compares the first time interval $t_D$ with the first time threshold $t_{D\_ref}$ and provides an ON-time control signal ZOFF at the output terminal to control the second ON-time of the secondary switch 20. The secondary switch is turned on for the second ON-time after a current flowing through the secondary switch decreases to zero. The second ON-time of the secondary switch 20 is generated and adjusted based on the comparison result between the first time interval $t_D$ and the first time threshold $t_{D\_ref}$ so that in the next switching cycle, the first time interval $t_D$ is closer to the first time threshold $t_{D\_ref}$. In one embodiment, when the first time interval $t_D$ is less than the first time threshold $t_{D\_ref}$, the second ON-time of the secondary switch 20 is extended. When the first time interval $t_D$ is longer than the first time threshold $t_{D\_ref}$, the second on-time of the secondary switch 20 is shorten. Finally, in the subsequent switching cycle, the first time interval $t_D$ is closer to the first time threshold $t_{D\_ref}$.

Referring still to FIG. 1, the secondary logic circuit 306 is coupled to the ON-time control circuit 305 to receive the ON-time control signal ZOFF, and is configured to generate a secondary control signal CTRLS, which is coupled to a control terminal of the secondary switch 20 through a SDrv pin, to control the turning-on and turning-off of the secondary switch 20.

The twice off detection circuit 307 is configured to provide a primary on enable signal PRON when the secondary switch 20 is turned off after the second ON-time of the secondary switch 20.

The isolation circuit 308 has an input terminal configured to receive the primary on enable signal PRON and an output terminal for outputting a synchronous signal SYNC electrically isolated from the primary on enable signal PRON, so as to achieve electrical isolation between the primary side and the secondary side. The isolation circuit 308 may comprise opto-coupler, transformer, capacitor or any other suitable electrical isolation device. In other embodiments, the isolation circuit 308 may be located outside of the controller 30.

The zero cross detection circuit 309 is configured to detect if a voltage $V_{Pri\_DS}$ across the primary switch 10 crosses zero, and provide a voltage zero-crossing detection signal PON. In one embodiment, the zero cross detection circuit 309 is coupled to the auxiliary winding of the transformer T, and receives a voltage detection signal VZCD representative of the voltage $V_{Pri\_DS}$ across the primary switch 10 through a ZCD pin of the controller 30, and compares the voltage detection signal VZCD with a zero-crossing threshold $V_{ZCD\_TH}$ and provides the voltage zero-crossing detection signal PON at the output terminal based on the comparison. In one embodiment, the zero-crossing threshold $V_{ZCD\_TH}$ is 20 mV.

The primary logic circuit 310 is coupled to the output terminal of the isolation circuit 308 to receive the synchronous signal SYNC, and is further coupled to the zero cross detection circuit 309 to receive the voltage zero-crossing detection signal PON, and generates a primary control signal CTRLP. The primary control signal CTRLP is provided to a control terminal of the primary switch 10 via a PDrv pin of the controller to control the primary switch 10. In some embodiments, when the synchronous signal SYNC comes while the voltage $V_{Pri\_DS}$ across the primary switch 10 crossing zero, the primary switch 10 is turned on after a time delay $t_{Delay}$.

Generally, silicon-based devices (such as MOSFETs) require a large amount of energy to fully discharge their output capacitance to achieve zero-voltage switching due to their large output capacitance. However, in practical applications, the output capacitance of silicon-based device is often not fully discharged in consideration of both the cost and the loss. Therefore, when the zero-voltage switching technology is applied, a partial zero voltage switching is used, rather than a full zero voltage switching in the silicon-based devices. The voltage across the silicon-based device is often not 0V but 15-25V when the silicon-based device is turned on, the controller 30 achieves ZVS for only a part of its operating range. Such partial zero-voltage turning-on will not only increase the conduction loss, but also the secondary switch 20 will bear high spike voltage, resulting in worse electromagnetic interference.

In one embodiment, the primary switch 10 may include an emerging wide bandgap device, such as a gallium nitride (GaN) or silicon carbide (SiC), instead of a traditional silicon-based device. Wide bandgap devices may operate at higher switching frequencies without deterioration in efficiency and have output capacitances much lower than silicon-based devices, such devices will further reduce the size of isolated switching converters while achieving high efficiency.

Furthermore, the ON-time control circuit 305 shown in FIG. 1 may dynamically adjust the second ON-time of the secondary switch 20 by the comparison of the first time interval $t_D$ and the first time threshold $t_{D\_ref}$, so as to adaptively and fully discharge the output capacitance of the primary switch 10 according to the actual operation, to achieve the best performance. In one embodiment, the zero-crossing threshold $V_{ZCD\_TH}$ is tens of millivolts, which is much smaller than the voltage when the silicon-based device is turned on with zero voltage switching technique.

Figure 2:
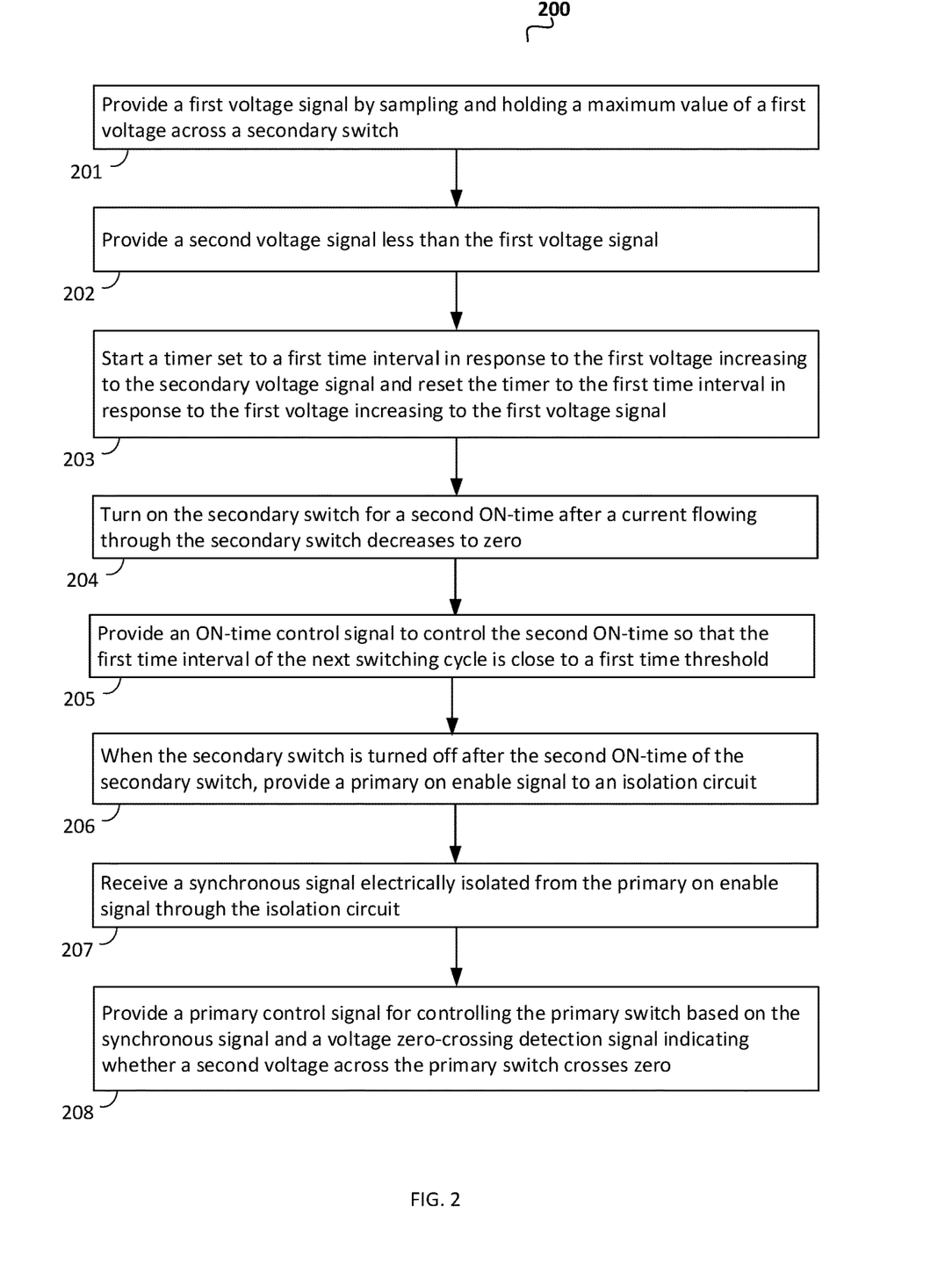
FIG. 2 shows a flow diagram of a control method 200 for the isolated switching converter 100 in accordance with an embodiment of the present invention.

FIG. 2 shows a flow diagram of a control method 200 for the isolated switching converter 100 in accordance with an embodiment of the present invention. The control method 200 comprises steps 201~208.

At step 201, a first voltage signal $V_{SRD}$ is provided by sampling and holding a maximum value of a first voltage across the secondary switch 20.

At step 202, a second voltage signal $k*V_{SRD}$ is provided based on the first voltage signal $V_{SRD}$. The second voltage signal $k*V_{SRD}$ is less than the first voltage signal $V_{SRD}$. In one embodiment, k is a ratio greater than 0 and less than 1. In one embodiment, the second voltage signal $k*V_{SRD}$ is provided by dividing the first voltage signal $V_{SRD}$. In another embodiment, a bias voltage signal $(1-k)*V_{SRD}$ is subtracted from the first voltage signal $V_{SRD}$ to provide the second voltage signal $k*V_{SRD}$.

At step 203, start the timer 303 set to the first time interval $t_D$ in response to the first voltage $V_{Sec\_SR}$ increasing to the secondary voltage signal $k*V_{SRD}$, and reset the timer 303 to the first time interval $t_D$ in response to the first voltage $V_{Sec\_SR}$ increasing to the first voltage signal $V_{SRD}$.

At step 204, after a current flowing through the secondary switch 20 decreases to zero, the secondary switch 20 is turned on for a second ON-time TON.

At step 205, the ON-time control signal ZOFF is provided to control the second ON-time TON so that the first time interval $t_D$ in the next switching cycle is close to the first time threshold $t_{D\_ref}$.

At step 206, when the secondary switch 20 is turned off after the second ON-time TON, the primary on enable signal PRON is provided the isolation circuit 308.

At step 207, the synchronous signal SYNC electrically isolated from the primary on enable signal PRON is received through the isolation circuit 308.

At step 208, provide the primary control signal CTRLS for controlling the primary switch 10 based on the synchronous signal SYNC and the voltage zero-crossing detection signal PON indicating whether the voltage $V_{Pri\_DS}$ across the primary switch crosses zero. In one embodiment, the primary switch 10 is turned on after a delay time, in response to the voltage $V_{Pri\_DS}$ across the primary switch 10 crossing zero.

Figure 3:
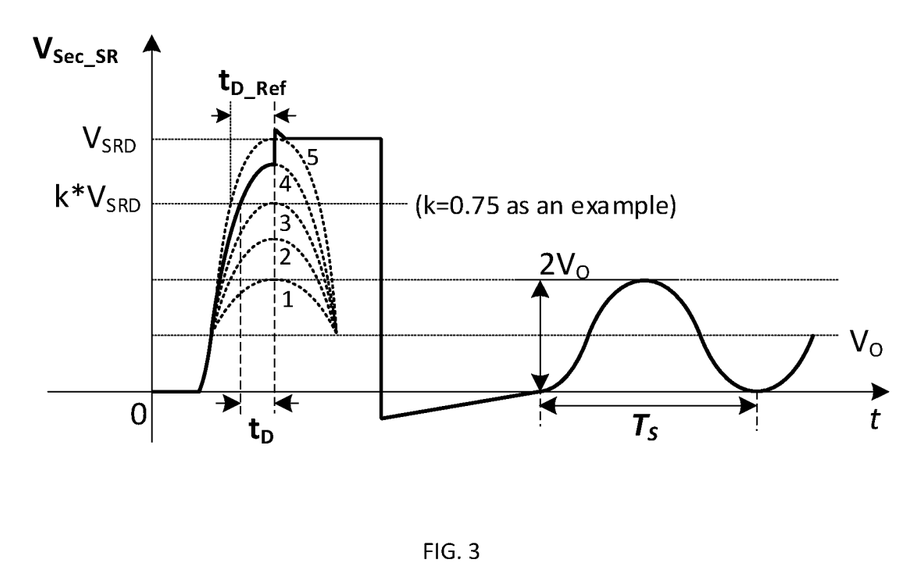
FIG. 3 shows a schematic diagram of a control principle for a second ON-time of the secondary switch in accordance with an embodiment of the present invention.

FIG. 3 shows a schematic diagram of a control principle for the second ON-time of the secondary switch in accordance with an embodiment of the present invention.

As shown in FIG. 3, curve 1 shows the waveform of the voltage $V_{Sec\_SR}$ across the secondary switch 20 when the second ON-time of the secondary switch 20 is 0. In other words, in curve 1, when the secondary switch 20 is turned off after the current flowing through the secondary switch 20 decreases to zero, the secondary switch 20 is not turned on again. And wherein $T_s$ shown in FIG. 3 is an oscillation period of the sinusoidal oscillation of the voltage $V_{Sec\_SR}$ across the secondary switch 20 with an output voltage Vo as a center value after the current flowing through the secondary switch 20 decreases to zero.

Look up from curve 1 to curve 5, the second ON-time of the secondary switch is increased gradually, and the voltage $V_{Sec\_SR}$ across the secondary switch 20 when the primary switch 10 is turned on is also increased accordingly. When the primary switch 10 achieves full zero voltage switching, the voltage $V_{Sec\_SR}$ across the secondary switch 20 is increased to the curve 5 as shown in FIG. 3. The first time threshold $t_{D\_ref}$ is set using the following relationship:

$$t_{D\_Ref} = T_S \frac{\arccos(k)}{2\pi}$$

where k is a ratio of the second voltage signal $K*V_{SRD}$ and the first voltage signal $V_{SRD}$. In one embodiment, the ratio k=0.75.

Referring still to the curve 3 shown in FIG. 3, after the second-ON time of the secondary switch 20, the negative current is not enough to increase the voltage $V_{Sec\_SR}$ across the secondary switch 20 up to the second voltage signal $k*V_{SRD}$ when the primary switch 10 is turned on.

In this case, the timing duration when the voltage $V_{Sec\_SR}$ across the secondary switch 20 increases from the second voltage signal $k*V_{SRD}$ rise to the first voltage signal $V_{SRD}$ is 0, that is, the first time interval $t_D$ is timed be 0. Obviously, the first time threshold $t_{D\_ref}$ is greater than the first time interval $t_D$. In response to a first time difference between the first time threshold $t_D$ ref and the first time interval $t_D$, the second ON-time of the secondary switch 20 is increased, to further increase the voltage $V_{Sec\_SR}$ across the secondary switch 20 when the primary switch 10 is turned on in the next switching cycle, so that the first time interval $t_D$ of the next switching cycle is close to the first time threshold $t_D$ ref. Compared to the curve 3, as shown the curve 4 of FIG. 3, the voltage $V_{Sec\_SR}$ across the secondary switch 20 when the primary switch 10 is turned on is increased in curve 4, so that the first time interval $t_D$ is closer to the first time threshold $t_{D\_Ref}$. Until the voltage $V_{Sec\_SR}$ follows the curve 5, the first time interval $t_D$ is equal to the first time threshold $t_{D\_Ref}$, and the full zero-voltage switching is achieved.

It can be seen that, in order to achieve the full zero-voltage turning-on of the primary switch 10, the second ON-time of the secondary switch 20 can be increased. A longer second ON-time may lead to a higher magnitude of negative current flowing through the secondary switch 2. And subsequently when the primary switch 10 is turned on in the next switching cycle, a lower voltage $V_{Pri\_DS}$ across the primary switch will be obtained, and thus the partial zero-voltage turning-on is improved to the full zero-voltage turning-on.

However, if the second ON-time of the secondary switch 20 is too long, it will cause the first time interval $t_D$ exceeds the first time threshold $t_{D\_Ref}$, causing unnecessary energy waste. In this case, in response to a second time difference ref/between the first time interval $t_D$ and the first time threshold $t_D$ the ON-time control circuit 305 will reduce the second ON-time of the secondary switch 20, so that the first time interval $t_D$ of the next switching cycle decreases and be close to the first time threshold $t_{D\_ref}$ to provide a minimum energy that enables the primary switch 10 to achieve the zero voltage switching. Therefore, the zero voltage switching of this embodiment may save the conduction loss of the primary switch 10.

Taking k=0.75 as an example, according to the curve 5, the time interval from $0.75*V_{SRD}$ to $V_{SRD}$ is set to be the first time threshold $t_{D\_Ref}$. In one embodiment, the first time threshold $t_{D\_Ref}$ is determined by the external reference resistor $R_{TD}$. Theoretically, regardless of the first voltage signal $V_{SRD}$ and the output voltage Vo, the first time threshold $t_{D\_Ref}$ for the zero-voltage turning-on is a fixed value. Therefore, by selecting the appropriate resistor $R_{TD}$, the full zero-voltage switching under different input and output voltages can be obtained.

Accordingly, according to the embodiments shown in this disclosure, the isolated switching converter 100A may meet the high power density, high switching frequency, high efficiency, and electromagnetic interference standards required by USB PD applications, while maintaining the low cost.

Figure 4:
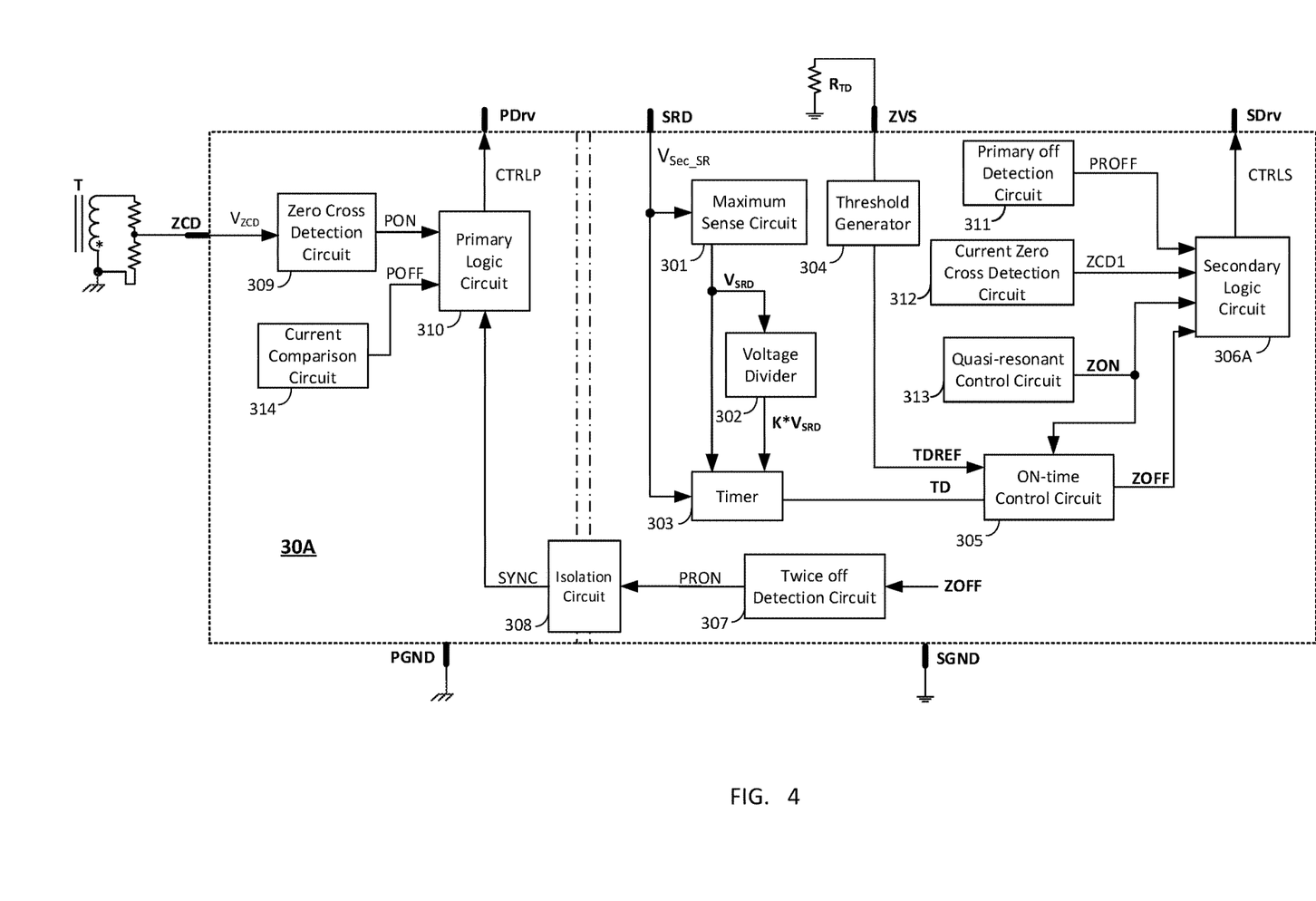
FIG. 4 shows a schematic diagram of a controller 30 for an isolated switching converter in accordance with an embodiment of the present invention.

FIG. 4 shows a schematic diagram of a controller 30 for an isolated switching converter in accordance with an embodiment of the present invention.

The controller 30A shown in FIG. 4 is similar with the controller 30 shown in FIG. 1, the difference is that the controller 30A further comprises a primary off detection circuit 311, a current zero cross detection circuit 312 and a quasi-resonant control circuit 313 located at the secondary side, and a current comparison circuit 314 located at the primary side.

In the example shown in FIG. 4, the primary off detection circuit 311 is configured to detect if the primary switch 10 is off and provide a primary off detection signal PROFF. The primary off detection circuit 311 may detect whether the primary switch 10 is off based on the voltage $V_{Sec\_SR}$ across the secondary switch 20, the current flowing though the secondary switch 20 or a voltage across the secondary winding and so on. The primary off detection circuit 311 may also receive signals indicating whether the primary switch 10 is off from the primary side.

The current zero-crossing detection circuit 312 is configured to detect whether the current flowing through the secondary switch 20 crosses zero and generate a zero-crossing detection signal ZCD1. The quasi-resonant control circuit 313 is coupled to the secondary switch 20 and is configured to sense the voltage $V_{Sec\_SR}$ across the secondary switch 20 when the secondary switch 20 is off, and provide an on control signal ZON corresponding to a target locked valley number for turning ON the secondary switch 20. It will be understood by those of ordinary skill that the quasi-resonant control is only an example, and the isolated switching converter under discontinuous conduction mode controlled by other control methods also satisfies the spirit and protection scope of the present invention.

As mentioned above, the ON-time control circuit 305 adjusts the second ON-time of the secondary switch 20, and generates the ON-time control signal ZOFF when the ON-time of the secondary switch 20 reaches the second ON-time TON.

The secondary logic circuit 306A has a first input terminal, a second input terminal, a third input terminal, a fourth input terminal and an output terminal, wherein the first input terminal is coupled to the primary off detection circuit 311 to receive the primary off detection signal PROFF, the second input terminal is coupled to the output terminal of the current zero cross detection circuit 312 to receive the zero-crossing detection signal ZCD1, the third input terminal is coupled to the quasi-resonant control circuit 313 to receive the on control signal ZON, the fourth input terminal is coupled to the ON-time control circuit 305A to receive the ON-time control signal ZOFF. The secondary logic circuit 306A generates the secondary control signal CTRLS based on the primary off detection signal PROFF and the zero-crossing detection signal ZCD1 to control the first switching of the secondary switch 20. In addition, the secondary logic circuit 306A also provides the secondary control signal CTRLS based on the on control signal ZON and the ON-time control signal ZOFF to control the second switching of the secondary switch 20. When the twice off detection circuit 307 detects that the secondary switch 20 is turned off after the second ON-time, it provides the primary on enable signal PRON to the isolation circuit 308.

In addition, the switching converter 100A further comprises a current comparison circuit 314. The current comparison circuit 314 has a first input terminal, a second input terminal and an output terminal, wherein the first input terminal receives a primary current sensing signal ISENP representing the current flowing through the primary switch 10, and the second input terminal receives a first threshold voltage VTH1. The current comparison circuit 314 compares the primary current sensing signal ISENP with the first threshold voltage VTH1, and generates a current comparison signal POFF at the output terminal. The primary logic circuit 310 is coupled to the output terminal of the current comparison circuit 314 to receive the current comparison signal POFF, and based on the current comparison signal POFF, the voltage zero-crossing detection signal PON and the synchronous signal SYNC, to generate the primary control signal CTRLP to control the primary switch 10. When the current ISENP flowing through the primary switch 10 reaches the first threshold voltage VTH1, the primary switch 10 is turned off. The first threshold voltage VTH1 may be a constant value, or may dependent on the synchronous signal SYNC.

Figure 5:
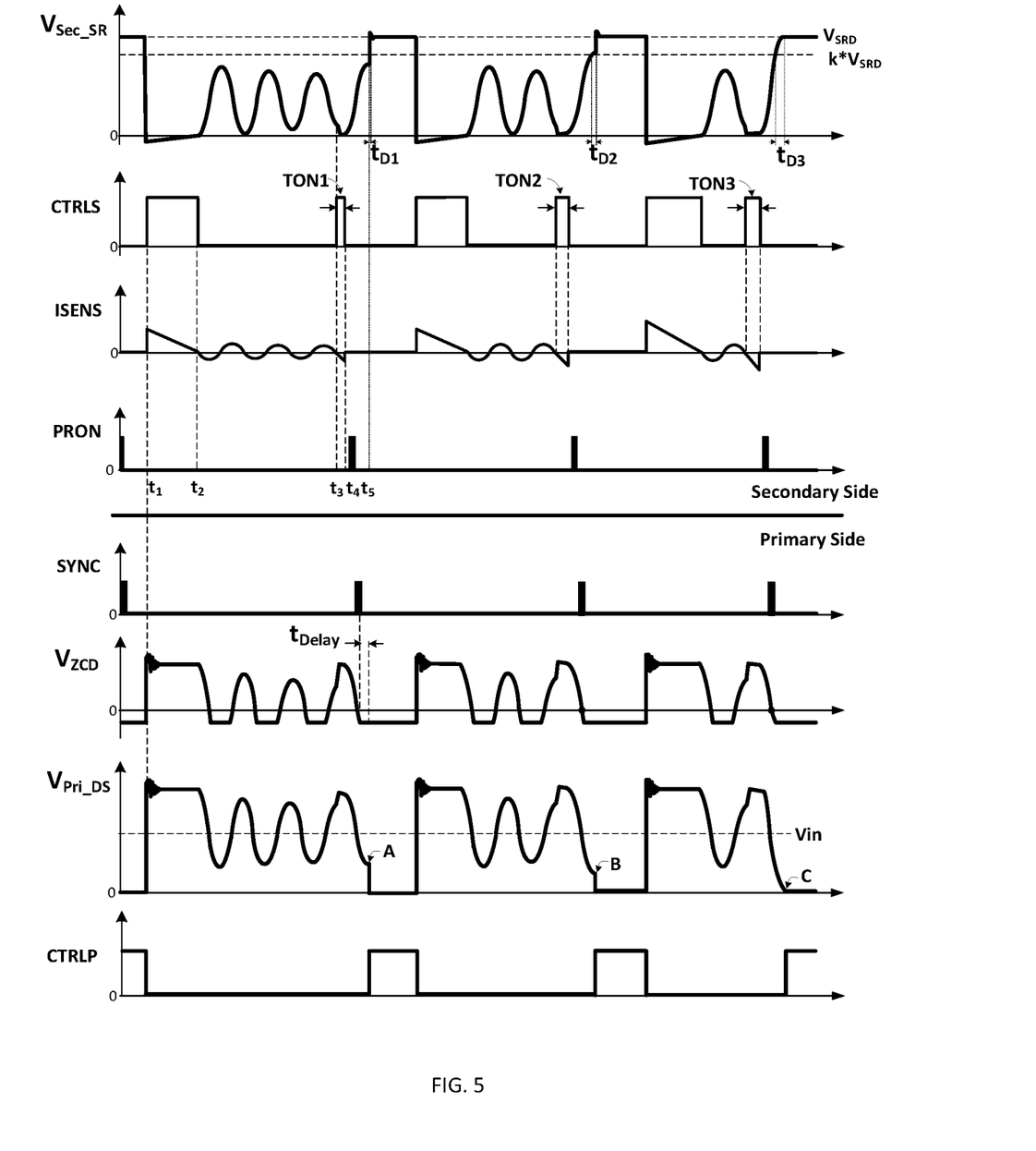
FIG. 5 shows a working waveform diagram of the isolated switching converter in accordance with an embodiment of the present invention.

FIG. 5 shows a working waveform diagram of the isolated switching converter in accordance with an embodiment of the present invention. As shown in FIG. 5, in a switching cycle, for example, at time t1, the primary control signal CTRLP is changed from high level to low level, the primary switch 10 is turned off. After the primary switch 10 is turned off, the voltage $V_{Sec\_SR}$ across the secondary switch 20 is changed from positive to negative, and thus the secondary control signal CTRLS changes from low level to high level, the secondary switch 20 is turned on for a first time.

After that, at time t2, when the current ISENS flowing through the secondary switch 20 decreases to cross zero, the secondary control signal CTRLS changes from high level to low level, the secondary switch 20 is turned off accordingly. The first conduction of the secondary switch 20 finishes.

Subsequently, when the currents flowing through the primary side and the secondary side are both zero, the energy storage element and the parasitic capacitance of the switch begin to resonate to generate a resonant voltage whose waveform is detected by the quasi-resonant circuit 313 located on the secondary side. At time t3, due to the quasi-resonant control, the voltage $V_{Sec\_SR}$ across the secondary switch 20 is detected when the resonant voltage reaches the target locked valley number (e.g., a third valley) in the current switching cycle, the on control signal ZON changes from low level to high level, and the secondary control signal CTRLS also becomes high, and the secondary switch 20 is turned on again.

At time t4, when the rising edge of the ON-time control signal ZOFF comes, the secondary control signal CTRLS changes from high level to low level, the secondary switch 20 is turned off again. The second conduction of the secondary switch 20 finishes. As shown in FIG. 5, the second ON-time of the secondary switch 20 is labeled as TON1.

In addition, the twice off detection circuit 307 detects the second turning-off of the secondary switch 20 after the second ON-time, and provides a primary on enable signal PRON. When a rising edge of the primary on enable signal PRON comes, almost at the same time, the synchronous signal SYNC outputted by the isolation circuit 308 also changes from low level to high level. Then when the zero cross detection circuit 309 detects if the voltage $V_{ZCD}$ across the auxiliary winding crosses zero, the primary switch 10 is turned on after a delay time $t_{Delay}$ in response to the voltage $V_{ZCD}$ crossing zero.

As shown in FIG. 5, when the primary switch 10 is turned on at point A, the voltage $V_{Pri\_DS}$ across the primary switch 10 is still relatively high, The timer 303 starts timing when the voltage $V_{Sec\_SR}$ across the secondary switch 20 is quickly pulled up to the second voltage signal $k^*V_{SRD}$. The timer 303 stops timing when the voltage $V_{Sec\_SR}$ across the secondary switch 20 increases to the first voltage signal $V_{SRD}$, and the timing duration is the first time interval $t_{D1}$. As shown in FIG. 5, the first time interval $t_{D1}$ of the current switching cycle is very short and is much smaller than the first time threshold $t_{D\_ref}$.

According to an embodiment of the present invention, in order to achieve full zero voltage turning-on, the ON-time control circuit 305 is configured to adjust (increase or reduce) the second ON-time of the secondary switch 20, based on the comparison between the first time interval $t_{D1}$ of the current switching cycle and the first time threshold $t_{D\_ref}$ provided by the threshold generator 304, so that the first time interval (labeled as $t_{D2}$) of the subsequent switching cycle is more closer to the first time threshold $t_{D\_ref}$.

As shown in FIG. 5, the second ON-time of the secondary switch 20 increases from TON1 to TON2, and when the primary switch 10 is turned on at point B, the voltage $V_{Pri\_DS}$ across the primary switch 10 is much smaller than the voltage level at point A. Then the timer 303 starts timing when the voltage $V_{Sec\_SR}$ across the secondary switch 20 increases to the second voltage signal $k^*V_{SRD}$ and stops timing when the voltage $V_{Sec\_SR}$ increases to the first voltage signal $V_{SRD}$. The timing duration of the timer 303 in this switching cycle is labeled as a time interval $t_{D2}$. Since the time interval $t_{D2}$ is still less than the first time threshold $t_{D\_ref}$, the ON-time control circuit 305 continues to increase the second-ON time of the secondary switch 20, from TON2 to TON3. Subsequently, when the primary switch 10 is turned on at point C, the voltage $V_{Pri\_DS}$ across the primary switch 10 is further reduced, and is further less than the voltage level at point B. At point C, the primary switch 10 is turned on at zero voltage. In the next switching cycle, the time interval $t_{D3}$ is closer to the first time threshold $t_{D\_ref}$.

It can be seen that, according to the embodiments of the present invention, the ON-time control circuit 305 dynamically adjust the second ON-time of the secondary switch 20 based on the comparison of the first time interval in the current switching cycle and the first time threshold $t_{D\_ref}$ and continuously adjust the second ON-time of the secondary switch, so that the first time interval of the next switching cycle is close to the first time threshold $t_{D\_ref}$. After one or more switching cycles, the primary switch 10 can achieve full zero voltage turning-on.

Figure 6:
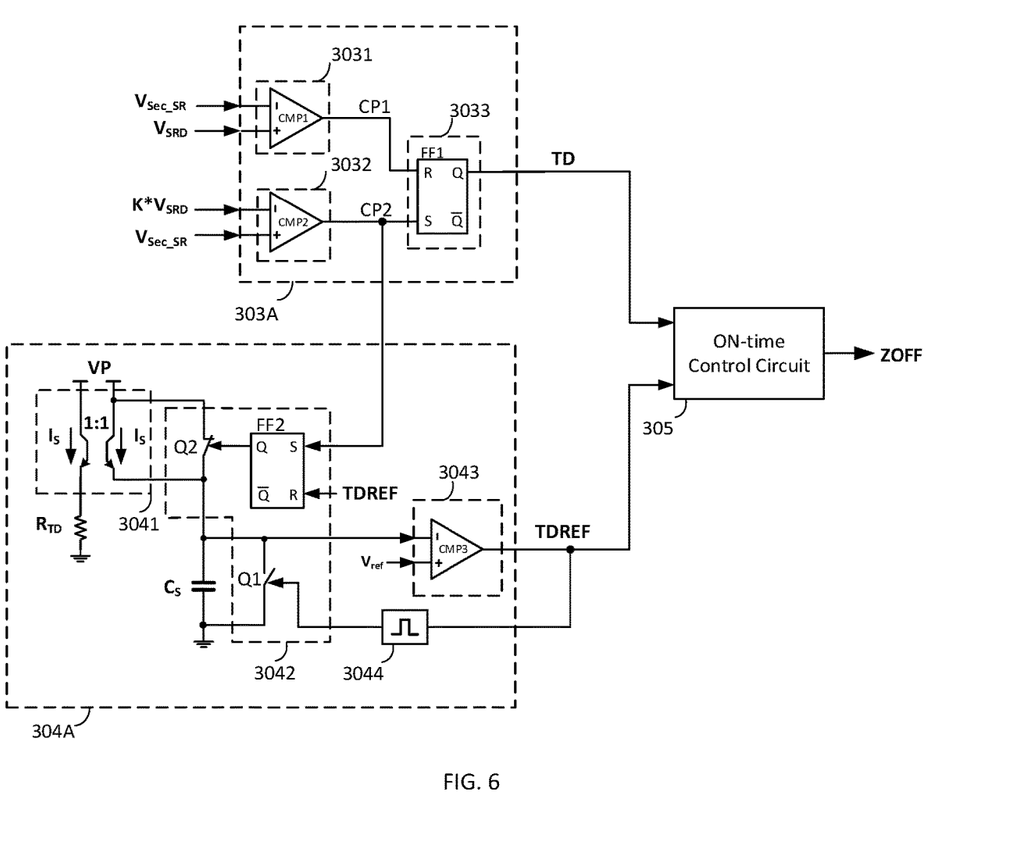
FIG. 6 shows a schematic diagram of a timer 303A and a threshold generator 304A in accordance with an embodiment of the present invention.

FIG. 6 shows a schematic diagram of a timer 303A and a threshold generator 304A in accordance with an embodiment of the present invention.

As shown in FIG. 6, the timer 303A comprises a first comparison circuit 3031, a second comparison circuit 3032 and a logic circuit 3033. The first comparison circuit 3031 compares the voltage $V_{Sec\_SR}$ across the secondary switch 20 with the first voltage signal $V_{SRD}$, and provides a first comparison signal CP1 at the output terminal. In one embodiment, when the voltage $V_{Sec\_SR}$ across the secondary switch 20 is increased to the first voltage signal $V_{SRD}$, the first comparison signal CP1 becomes a high level. In an example shown in FIG. 6, the first comparison circuit 3031 compares a comparator CMP1. The inverting input terminal of the comparator CMP1 is coupled to the output terminal of the maximum sense circuit 301 to receive the first voltage signal $V_{SRD}$, the non-inverting input terminal is coupled to the SRD pin of the controller 30A to receive the voltage $V_{Sec\_SR}$ across the secondary switch 20, the output terminal is configured to provide the first comparison signal CP1.

The second comparison circuit 3032 compares the voltage $V_{Sec\_SR}$ across the secondary switch 20 with the second voltage signal $k^*V_{SRD}$, and provides a second comparison signal CP2 at the output terminal. In one embodiment, when the voltage $V_{Sec\_SR}$ across the secondary switch 20 is increase to the second voltage signal $k^*V_{SRD}$, the second comparison signal CP2 becomes high level. In the example shown in FIG. 6, the second comparison circuit 3032 compares a comparator CMP2. The inverting input terminal of the comparator CMP2 is coupled to the output terminal of the voltage divider 302 to receive the second voltage signal $k^*V_{SRD}$, the non-inverting input terminal is coupled to the SRD pin of the controller 30A to receive the voltage $V_{Sec\_SR}$, the output terminal is configured to provide the second comparison signal CP2.

The logic circuit 3033 is configured to provide the first control signal TD based on the first comparison signal CP1 and the second comparison signal CP2. In one embodiment, the high-level width of the first control signal TD is corresponding to the first time interval tp. In the example shown in FIG. 6, the logic circuit 3033 comprises a RS flip-flop FF1. The RS flip-flop FF1 has a set terminal, a reset terminal and an output terminal, wherein the set terminal receives the second comparison signal CP2, the reset terminal receives the first comparison signal CP1, and the output terminal is configured to provide the first control signal TD. In one embodiment, the high-level width of the first control signal TD is the first time interval $t_D$.

The threshold generator 304A is configured to provide the second control signal TDREF which has a high-level width corresponding to the first time threshold $t_{D\_ref}$. In the example shown in FIG. 6, the threshold generator 304A comprises a current mirror 3041, a reference capacitor Cs, a switch control circuit 3042 and a third comparison circuit 3043. The current mirror 3041 has a current setting terminal and a current output terminal, wherein the current setting terminal is coupled to the reference resistor $R_{TD}$ through the ZVS pin of the controller 30A for setting a control current Is. The reference capacitor Cs has a first terminal and a second terminal, wherein the first terminal is coupled to the current output terminal of the current mirror 3041, and the second terminal is coupled to the secondary reference ground (SGND pin).

The switch control unit 3042 is coupled to the output terminal of the second comparison circuit 3032 to receive the second comparison signal CP2, and in response to the second comparison signal CP2, charges the reference capacitor Cs with the control current Is. As shown in FIG. 6, the switch control unit 3042 comprises a RS flip-flop FF2, a normally-on switch Q1 and a normally-off switch Q2. The RS flip-flop FF2 has a set terminal, a reset terminal and an output terminal, wherein the set terminal is coupled to the output terminal of the second comparison circuit 3032 to receive the second comparison signal CP2, and the reset terminal is coupled to receive the second control signal TDREF, the output terminal is coupled to the control terminal of the normally-on switch Q1. The normally-on switch Q1 is coupled between a power supply VP and the first terminal of the reference capacitor Cs. The normally-off switch Q2 is coupled in parallel with the reference capacitor Cs, and its control terminal is coupled to receive the second control signal TDREF.

The third comparison circuit 3043 compares the voltage VCs across the reference capacitor Cs with a reference voltage Vref, and generates the second control signal TDREF based on the comparison result. In the example shown in FIG. 6, the third comparison circuit 3043 comprises a comparator CMP3. The inverting input terminal of the comparator CMP3 is coupled to the first terminal of the reference capacitor Cs to receive the voltage VCs, the non-inverting input terminal receives the reference voltage Vref, and the output terminal is configured to provide the second control signal TDREF.

In one embodiment, the threshold generator 304A further comprises a one-shot circuit 3044, which is coupled between the output terminal of the third comparison circuit 3043 and the control terminal of the normally-on switch Q2, is configured to reset the voltage VCs to zero when the voltage VCs reaches the reference voltage Vref.

Referring still to FIG. 6, the ON-time control circuit 305 has a first input terminal, a second input terminal and an output terminal, wherein the first input terminal is coupled to receive the first control signal TD, and the second input terminal is coupled to receive the second control signal TDREF, based on the first control signal TD and the second control signal TDREF, the ON-time control circuit 305 is configured to provide the ON-time control signal ZOFF, for controlling the second ON-time of the secondary switch 20.

Figure 7:
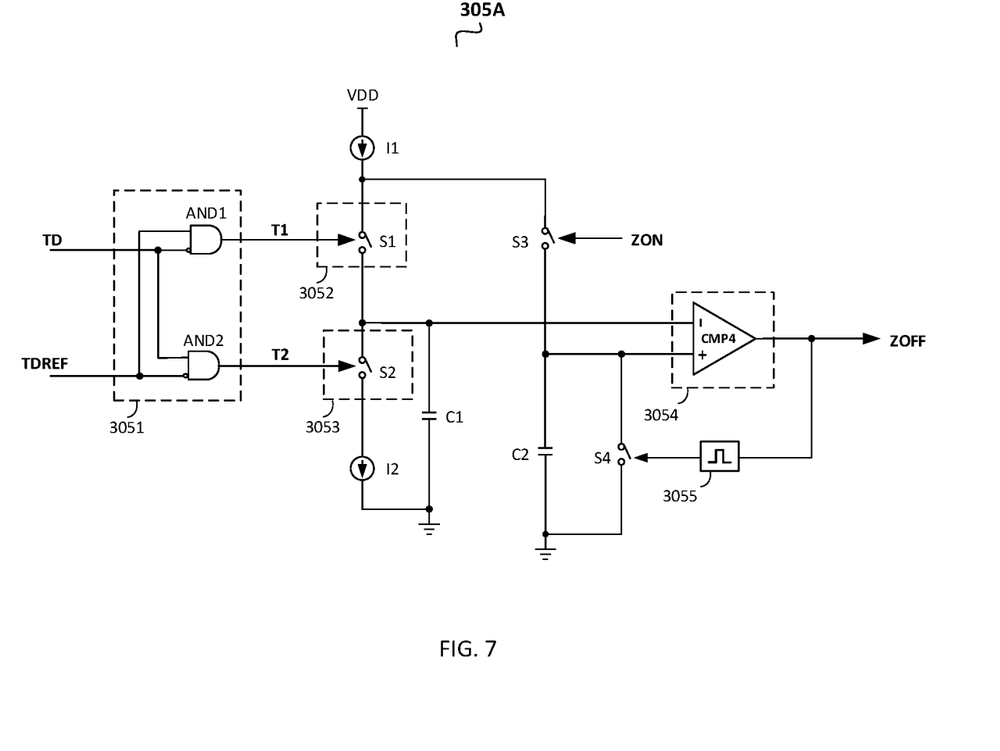
FIG. 7 shows a schematic diagram of an ON-time control circuit 305A in accordance with an embodiment of the present invention.

FIG. 7 shows a schematic diagram of an ON-time control circuit 305A in accordance with an embodiment of the present invention. In the example shown in FIG. 7, the ON-time control circuit 305A comprises a duration comparison circuit 3051, a charging control unit 3052, a discharging control unit 3053, a first capacitor C1, and a second capacitor C2 and a fourth comparison circuit 3054.

The duration comparison circuit 3051 has a first input terminal, a second input terminal, a first output terminal and a second output terminal, wherein the first input terminal is coupled to the output terminal of the timer 303A to receive the first control signal TD, the second input terminal is coupled to the output terminal of the threshold generation circuit 304A to receive the second control signal TDREF. Based on the first control signal TD and the second control signal TDREF, the duration comparison circuit 3051 is configured to provide a first enable signal T1 at the first output terminal, and provides a second enable signal T2 at the second output terminal. The first enable signal T1 represents the first time difference between the first time threshold $t_{D\_ref}$ and the first time interval $t_D$. The second enable signal T1 represents the second time difference between the first time interval tD and the first time threshold tD_ref.

In the example shown in FIG. 7, the duration comparison circuit 3051 comprises a first AND gate circuit AND1 and a second AND gate circuit AND2. The first AND gate circuit AND1 has a first input terminal, a second inverting input terminal and an output terminal, wherein the first input terminal is coupled to the output terminal of the timer 304A to receive the second control signal TDREF, the second reverse input terminal receives the first control signal TD, and the first AND gate circuit AND1 provides the first enable signal T1 at the output terminal. The first enable signal T1 indicates that the first time interval tD is less than the first time threshold tD_ref. The second AND gate circuit AND2 has a first input terminal, a second inverting input terminal and an output terminal, wherein the first input terminal is coupled to the output terminal of the timer 303A to receive the first control signal TD, the second reverse input terminal receives the second control signal TDREF, the second AND gate circuit AND2 provides the second enable signal T2 at the output terminal. The second enable signal T2 indicates that the first time interval $t_D$ is greater than the first time threshold $t_{D\_ref}$.

The charging control unit 3052 receives the first enable signal T1, and controls a first charging current source I1 to charge a first capacitor C1 based on the first enable signal T1. As shown in FIG. 7, the charging control unit 3052 is coupled between the output terminal of the first charging current source I1 and the first terminal of the first capacitor C1, a power supply terminal of the first current source I1 is coupled to a power supply, and the second terminal of the first capacitor C1 is coupled to the secondary reference ground. The charging duration of the first current source I1 to the capacitor C1 is determined by the first time difference. In the example shown in FIG. 7, the charging control unit 3052 comprises a switch S1 coupled between an output terminal of the first charging current source I1 and the first terminal of the first capacitor C1. In other embodiments, the first charging current source I1 has an enable control terminal to charge the first capacitor C1 only when the first enable signal T1 is active.

The discharging control unit 3053 receives the second enable signal T2, and controls the first discharge current source I2 to discharge the first capacitor C1 based on the second enable signal T2. As shown in FIG. 7, the discharging control unit 3053 is coupled between the first terminal of the first capacitor C1 and the input terminal of the discharge current source I2, and the output terminal of the first discharging current source I2 is coupled to the secondary reference ground. The discharging duration of the first discharge current source I2 to the first capacitor C1 is determined by the second time difference. In the embodiment shown in FIG. 7, the discharging control unit 3053 comprises a switch S2 coupled between the input terminal of the first discharge current source I2 and the first terminal of the first capacitor C1. In other embodiments, the first discharge current source I2 has an enable control terminal, and discharges the first capacitor C1 only when the second enable signal T2 is active.

The second capacitor C2 has a first terminal and a second terminal, wherein the first terminal is coupled to the output terminal of the first charging current source I1 through a switch S3, and the second terminal is connected to the secondary reference ground. The switch S3 is controlled by the on control signal ZON. When the secondary switch 20 is turned on after the current flowing through the secondary switch 20 decreases to zero, the first charging current source I1 begins to charge the second capacitor C2, and the voltage VC2 across the second capacitor C2 starts to increase from zero. The fourth comparison circuit 3054 compares the voltage VC1 across the first capacitor C1 with the voltage VC2 across the second capacitor C2, and generates the ON-time control signal ZOFF for control the second ON-time of the secondary switch 20. In one embodiment, when the voltage VC2 across the second capacitor C2 increases to the voltage VC1 across the first capacitor C1, the ON-time control signal ZOFF becomes high level, and the secondary switch 20 is turned off. In the example shown in FIG. 7, the fourth comparison circuit 3054 comprises a comparator CMP4. The non-inverting input terminal of the comparator CMP4 is coupled to the first terminal of the second capacitor C2 to receive the voltage VC2 across the second capacitor C2, and the inverting input terminal is coupled to the second terminal of the first capacitor C1 to receive the voltage VC1 across the first capacitor C1. The voltage VC1 provides the ON-time control signal ZOFF at its output.

In the embodiment shown in FIG. 7, when the secondary switch 20 is turned on again after the current flowing through the secondary switch 20 decreases to cross zero, that is, when the on control signal ZON changes from low level to high level, the voltage VC2 across the second capacitor C2 starts to increase from zero. When the voltage VC2 across the second capacitor C2 increases to reach the voltage VC1 across the first capacitor C1, the output of the fourth comparison circuit 3054 is reversed, the ON-time control signal ZOFF at the output terminal changes from low level to high level, and the secondary switch 20 is turned off again. Subsequently, the voltage VC2 across the second capacitor C2 is reset to zero by an output of a one-shot circuit 3055.

Figure 8:
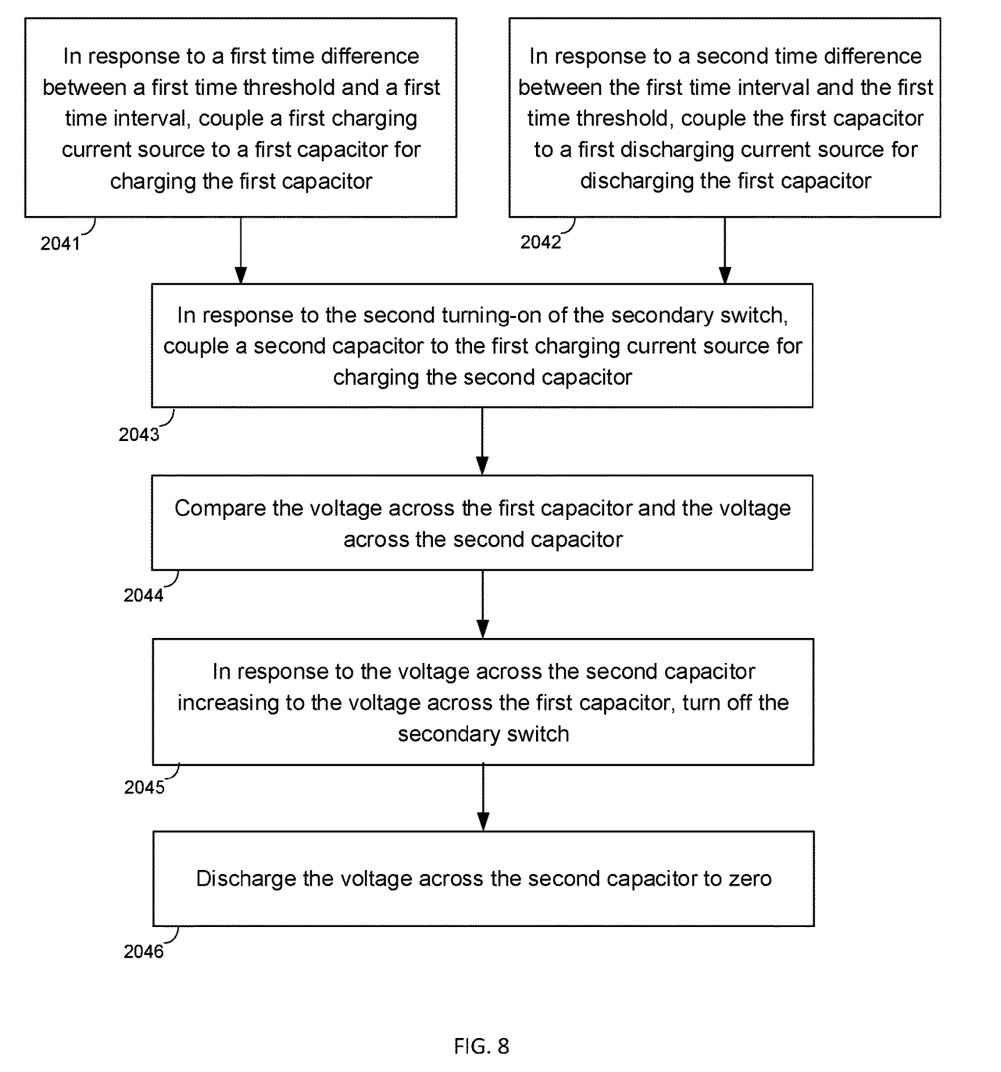
FIG. 8 shows a flow diagram of a method 204 for generating an ON-time control signal ZOFF in accordance with an embodiment of the present invention.

FIG. 8 illustrates a flow diagram of a method 204 for generating an ON-time control signal ZOFF in accordance with an embodiment of the present invention. The control method 204 comprises steps 2041 and 2045.

At step 2041, the first time interval of the current switching cycle is less than the first time threshold. In response to a first time difference between the first time threshold and the first time interval, a first charging current source is coupled to a first capacitor for charging the first capacitor.

At step 2042, the first interval of the current switching cycle is less than the first time threshold. In response to a second time difference between the first time interval and the first time threshold, a first discharging current source is coupled to the first capacitor for discharging the first capacitor.

At step 2043, in response to the second turning-on of the secondary switch after the current flowing through the secondary switch decreases to cross zero, the first charging current source is coupled to a second capacitor for charging the second capacitor, the voltage across the second capacitor starts to increase from zero.

At step 2044, the voltage across the first capacitor is compared with the voltage across the second capacitor.

At step 2045, when the voltage across the second capacitor is increased to the voltage across the first capacitor, the ON-time control signal is generated for control the second ON-time of the secondary switch.

In a further embodiment, the method 204 further comprises a step 2046. At step 2046, the voltage across the second capacitor is reset to zero.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in an isolated switching converter, wherein the isolated switching converter has a transformer having a primary winding and a secondary winding, a primary switch coupled to the primary winding and a secondary switch coupled to the secondary winding, the controller comprising:
a maximum sense circuit coupled to the secondary switch to sense a first voltage across the secondary switch and configured to provide a first voltage signal representative of a maximum value of the first voltage;
a voltage divider configured to receive the first voltage signal and provide a second voltage signal less than the first voltage signal;
a timer configured to start timing in response to the first voltage increasing to the second voltage signal and stop timing in response to the first voltage increasing to the first voltage signal, and the timing duration of the timer is a first time interval; and
an ON-time control circuit configured to provide an ON-time control signal to control a second ON-time of the secondary switch, wherein the secondary switch is turned on for the second ON-time after a current flowing through the secondary switch decreases to zero, and wherein the ON-time control circuit is configured to adjust the second ON-time of the secondary switch so that the first time interval of the next switching cycle is close to a first time threshold.

2. The controller of claim 1, further comprising:
a twice off detection circuit configured to provide a primary on enable signal when the secondary switch is turned off after the second ON-time of the secondary switch;
an isolation circuit having an input terminal configured to receive the primary on enable signal and an output terminal for outputting a synchronous signal electrically isolated from the primary on enable signal;
a zero cross detection circuit configured to provide a voltage zero-crossing detection signal by detecting whether a second voltage across the primary switch crosses zero; and
a primary logic circuit configured to receive the synchronous signal and the voltage zero-crossing detection signal and provide a primary control signal for controlling the primary switch based on the synchronous signal and the voltage zero-crossing detection signal.

3. The controller of claim 1, wherein the first time threshold is set using the following relationship:

$$t_{D\_Ref} = T_S \frac{\arccos(k)}{2\pi}$$

wherein $T_s$ is an oscillation period of the sinusoidal oscillation of the first voltage with an output voltage of the switching converter as the center value after the current flowing through the secondary switch decreases to zero, and k is the ratio of the second voltage signal and the first voltage signal.

4. The controller of claim 1, wherein the timer comprising:
a first comparison circuit configured to provide a first comparison signal by comparing the first voltage across the secondary switch with the first voltage signal;

a second comparison circuit configured provide a second comparison signal by comparing the second voltage signal with the first voltage across the secondary switch; and a logic circuit having a set terminal configured to receive the second comparison signal, a reset terminal configured to receive the first comparison signal and an output terminal for providing a first control signal which is enabled to have a first level, and the duration for the first control signal having the first level is the first time interval.

5. The controller of claim 3, further comprising:

a threshold generator configured to generate a second control signal which is enabled to have a first level, wherein the duration for the second control signal having the first level is the first time threshold.

6. The controller of claim 5, wherein the threshold generator comprising:

a current mirror having a current setting terminal and a current output terminal, wherein the current setting terminal is coupled to a reference resistor for setting a control current;

a reference capacitor having a first terminal coupled to the current output terminal of the current mirror and a second terminal coupled to a reference ground;

a switch control unit configured to charge the reference capacitor with the control current in response to the second comparison signal; and a third comparison circuit configured to provide the second control signal by comparing a third voltage across the reference capacitor with a reference voltage.

7. The controller of claim 1, wherein the ON-time control circuit comprising:

a charging control unit configured to couple a first charging current source to a first capacitor for charging the first capacitor, in response to a first time difference between the first time threshold and the first time interval;

a discharging control unit configured to couple the first capacitor to a first discharging current source for discharging the first capacitor, in response to a second time difference between the first time interval and the first time threshold;

a second capacitor configured to be charged by the first charging current source in response to the turning-on of the secondary switch after the current flowing through the secondary switch decreases to zero; and a fourth comparison circuit configured to provide the ON-time control signal by comparing a fourth voltage across the first capacitor with a fifth voltage across the second capacitor.

8. The controller of claim 1, wherein at least one of the primary switch and the secondary switch comprises a GaN switch or a SiC switch.

9. An isolated switching converter, comprising:

a transformer having a primary winding and a secondary winding;

a primary switch coupled to the primary winding;

a secondary switch coupled to the secondary winding;

a controller, comprising:

a maximum value sensing circuit coupled to the secondary switch to sense a first voltage across the secondary switch and configured to provide a first voltage signal representative of a maximum value of the first voltage;

a voltage divider configured to provide a second voltage signal less than the first voltage signal;

a timer configured to start timing when the first voltage increases to the second voltage signal and stop timing when the first voltage increases to the first voltage signal, and the timing duration of the timer is a first time interval; and an ON-time control circuit configured to provide an ON-time control signal to control a second ON-time of the secondary switch, wherein the secondary switch is turned on for the second ON-time after a current flowing through the secondary switch decreases to zero, and wherein the ON-time control circuit is configured to adjust the second ON-time of the secondary switch so that the first time interval of the next switching cycle is close to a first time threshold.

10. The isolated switching converter of claim 9, further comprises:

a twice off detection circuit configured to provide a primary on enable signal when the secondary switch is turned off after the second ON-time of the secondary switch;

an isolation circuit having an input terminal configured to receive the primary on enable signal and an output terminal for outputting a synchronous signal electrically isolated from the primary on enable signal;

a zero cross detection circuit configured to provide a voltage zero-crossing detection signal by detecting whether a second voltage across the primary switch crosses zero; and a primary logic circuit configured to receive the synchronous signal and the voltage zero-crossing detection signal and provide a primary control signal for controlling the primary switch based on the synchronous signal and the voltage zero-crossing detection signal.

11. The isolated switching converter of claim 9, wherein the first time threshold is set using the following relationship:

$$t_{D\_Ref} = T_S \frac{\arccos(k)}{2\pi}$$

wherein $T_s$ is an oscillation period of the sinusoidal oscillation of the first voltage with an output voltage of the switching converter as a center value after the current flowing through the secondary switch decreases to zero, and k is the ratio of the second voltage signal and the first voltage signal.

12. The isolated switching converter of claim 9, wherein the timer comprising:

a first comparison circuit configured to provide a first comparison signal by comparing the first voltage across the secondary switch with the first voltage signal;

a second comparison circuit configured provide a second comparison signal by comparing the second voltage signal with the first voltage across the secondary switch; and a logic circuit having a set terminal configured to receive the second comparison signal, a reset terminal configured to receive the first comparison signal and an output terminal for providing a first control signal which is enabled to have a first level, and the duration for the first control signal having the first level is the first time interval.

13. The isolated switching converter of claim 9, further comprises a threshold generator configured to generate a second control signal which is enabled to have a first level, wherein the time duration for the second control signal having the first level is the first time threshold, and the threshold generator comprising:
- a current mirror having a current setting terminal and a current output terminal, wherein the current setting terminal is coupled to a reference resistor for setting a control current;
- a reference capacitor having a first terminal coupled to the current output terminal of the current mirror and a second terminal coupled to a reference ground;
- a switch control unit configured to charge the reference capacitor with the control current in response to the second comparison signal; and
- a third comparison circuit configured to provide the second control signal by comparing a third voltage across the reference capacitor with a reference voltage.

14. The isolated switching converter of claim 9, wherein the ON-time control circuit comprising:
- a charging control unit configured to couple a first charging current source to a first capacitor for charging the first capacitor, in response to a first time difference between the first time threshold and the first time interval;
- a discharging control unit configured to couple the first capacitor to a first discharging current source for discharging the first capacitor, in response to a second time difference between the first time interval and the first time threshold;
- a second capacitor configured to be charged by the first charging current source in response to the turning-on of the secondary switch after the current flowing through the secondary switch decreases to zero; and
- a fourth comparison circuit configured to provide the ON-time control signal by comparing a fourth voltage across the first capacitor with a fifth voltage across the second capacitor.

15. A control method used in an isolated switching converter, wherein the isolated switching converter has a transformer having a primary winding and a secondary winding, a primary switch coupled to the primary winding and a secondary switch coupled to the secondary winding, the control method comprising:
- providing a first voltage signal by sampling and holding a maximum value of a first voltage across the secondary switch;
- providing a second voltage signal less than the first voltage signal;
- starting a timer set to a first time interval in response to the first voltage increasing to the secondary voltage signal and resetting the timer to the first time interval in response to the first voltage increasing to the first voltage signal;
- after a current flowing through the secondary switch decreases to zero, turning on the secondary switch for a second ON-time; and
- providing an ON-time control signal to control the second ON-time so that the first time interval of the next switching cycle is close to a first time threshold.

16. The control method of claim 15, further comprising:
- providing a primary on enable signal to an isolation circuit when the secondary switch is turned off after the second ON-time of the secondary switch;
- receiving a synchronous signal electrically isolated from the primary on enable signal through the isolation circuit; and
- providing a primary control signal for controlling the primary switch based on the synchronous signal and a voltage zero-crossing detection signal indicating whether a second voltage across the primary switch crosses zero.

17. The control method of claim 15, wherein the first time threshold is set using the following relationship:

$$t_{D\_Ref} = T_S \frac{\arccos(k)}{2\pi}$$

wherein $T_s$ is an oscillation period of the sinusoidal oscillation of the first voltage with an output voltage of the switching converter as a center value after the current flowing through the secondary switch decreases to zero, and k is the ratio of the second voltage signal and the first voltage signal.

18. The control method of claim 17, wherein setting the first time threshold comprising:
- setting a control current by selecting a reference resistor;
- charging a reference capacitor with the control current; and
- starting timing in response to the first voltage increasing to the secondary voltage signal and stopping timing in response to a third voltage across the reference capacitor increasing to a reference voltage, and wherein the timing duration is the first time threshold.

19. The control method of claim 15, wherein:
- in response to the first time interval less than the first time threshold, extending the second-ON time of the secondary switch; and
- in response to the first time interval longer than the first time threshold, reducing the second-ON time of the secondary switch.

20. The control method of claim 15, wherein providing the ON-time control signal comprising:
- in response to a first time difference between the first time threshold and the first time interval, coupling a first charging current source to a first capacitor for charging the first capacitor;
- in response to a second time difference between the first time interval and the first time threshold, coupling the first capacitor to a first discharging current source for discharging the first capacitor;
- in response to the turning-on of the secondary switch after the current flowing through the secondary switch decreases to zero, coupling a second capacitor to the first charging current source for charging the second capacitor; and
- in response to a fifth voltage across the second capacitor crossing a fourth voltage across the first capacitor, providing the ON-time control signal.

* * * * *